United States Patent Office 3,065,290
Patented Nov. 20, 1962

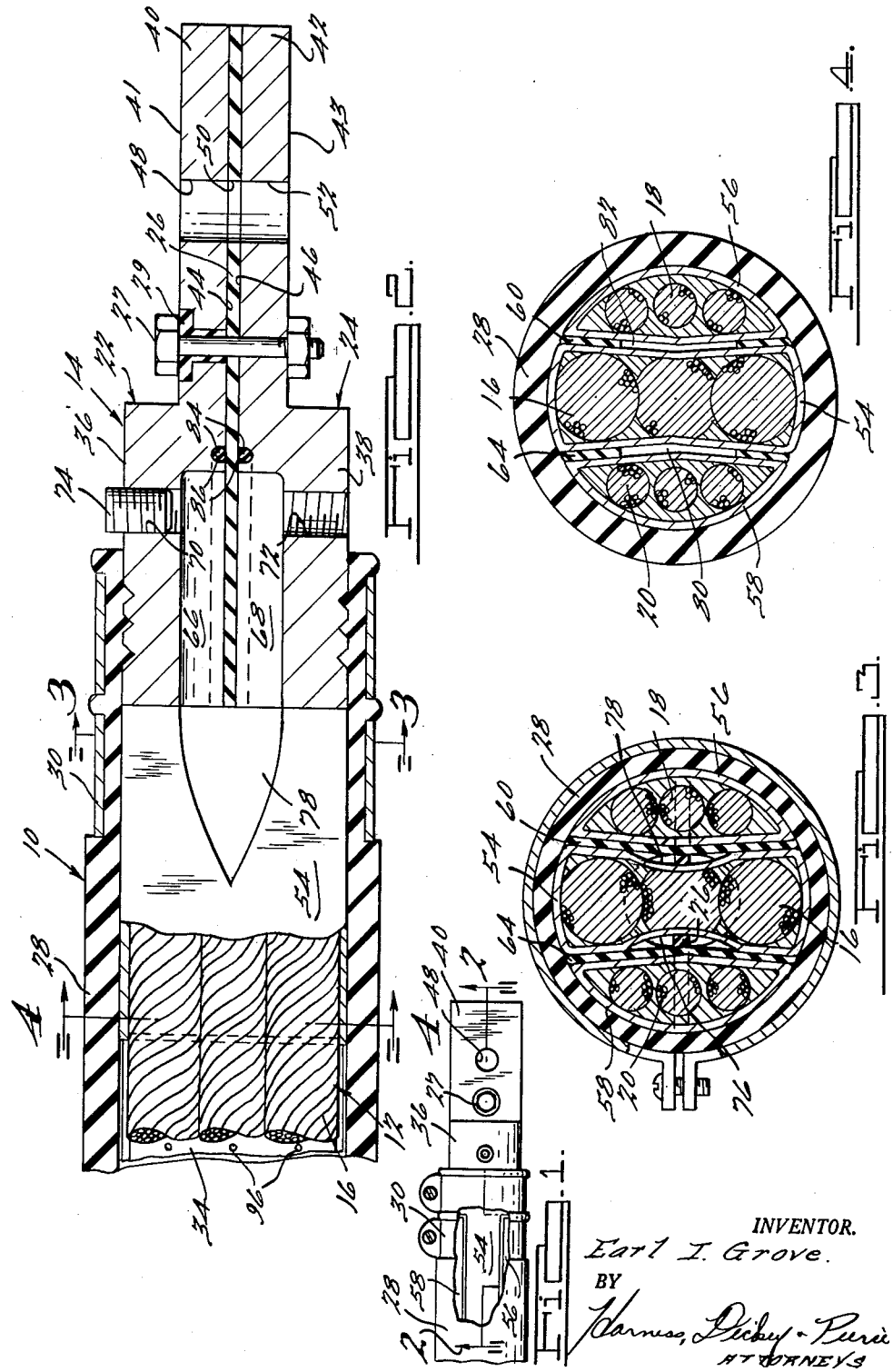

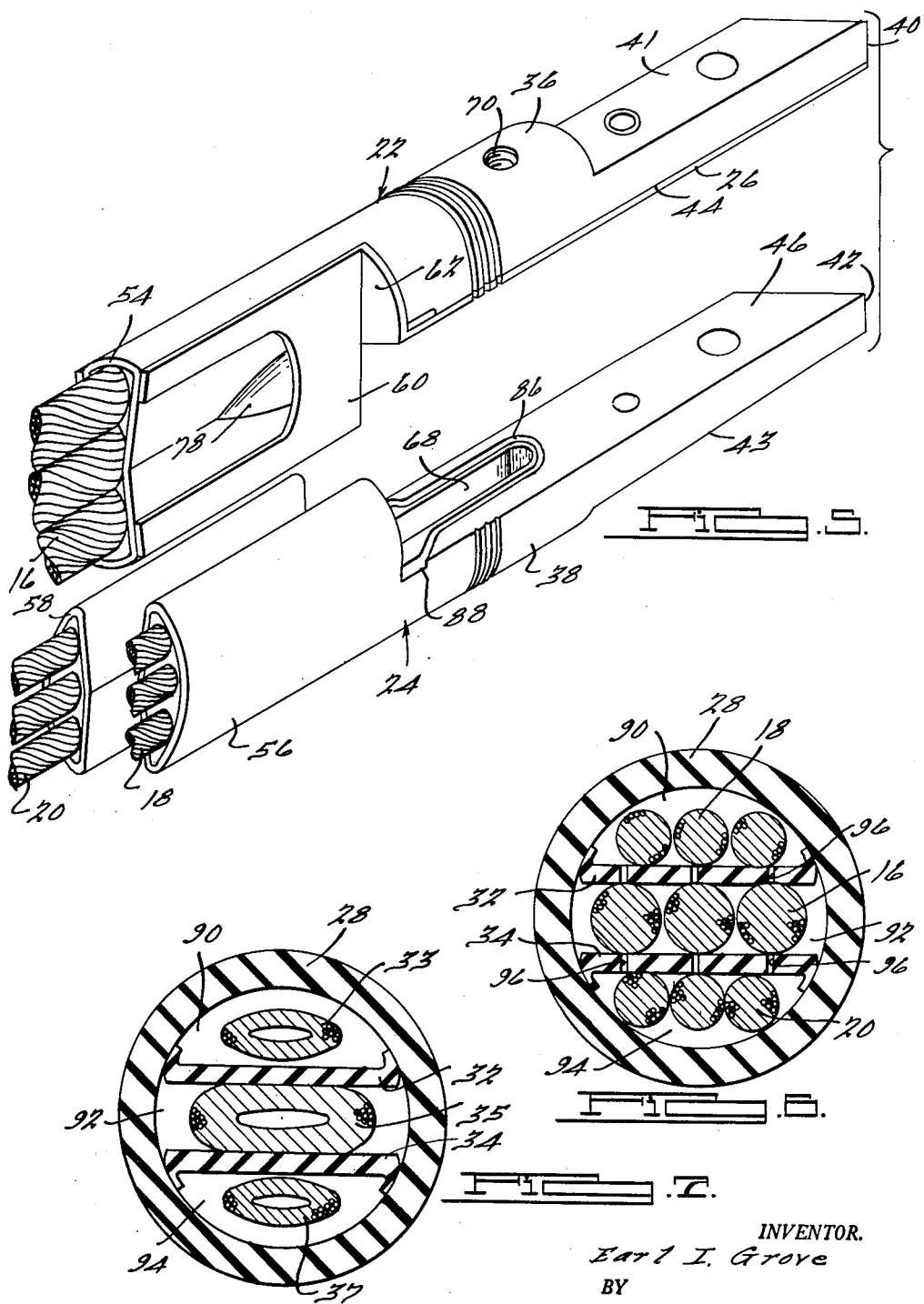

3,065,290
WATER-COOLED CABLE
Earl I. Grove, Walled Lake, Mich., assignor to Gar Wood Industries, Inc., Wayne, Mich., a corporation of Michigan
Filed Feb. 9, 1961, Ser. No. 88,215
9 Claims. (Cl. 174—15)

The present invention relates to water-cooled electric cables and more particularly to so-called windings for such cables.

Welding cables for connecting so-called spot welding guns to the transformers providing current for resistance welding operations have heretofore presented certain problems, especially in the case of dual conductor cables. Where two cable conductors are contained within the same casing or hose next to one another, the use of such cables has been accompanied by violent jerks or kicks resulting from the reaction of one conductor relative to the other conductor when the electric circuit is closed in making a weld. These kicks or jerks are substantial enough to interfere with the normal welding procedure and are quite troublesome to a welding operator. Moreover, since the current passing through these conductors is frequently as high as 50,000 to 60,000 amperes at a relatively low voltage, this kick has shortened the life of such cables considerably because of the mechanical strain imposed thereon by the kick of the cable. Due to the large amount of current carried by such cables, a great amount of heat is developed during welding operations, and it has accordingly been necessary to cool such cables by circulating cooling-water through them.

An important object of this invention, therefore, is to provide an improved welding cable which reduces the physical reaction between adjacent conductors of opposite polarity when the cable circuit is closed in making a weld.

A further object of the invention is to provide an improved welding cable having a lower inductive reactance and a maximum power factor.

A still further object is to provide an improved welding cable having a long lived electric welding cable winding of layers of conductors of opposite polarity which are easily mated with standard terminal portions and packed in hoses or cable casings so that space is provided for the circulation of cooling water to carry away heat developed during welding operations.

Further objects, features and advantages of this invention will become apparent from a consideration of the following description, the appended claims and the accompanying drawing in which:

FIGURE 1 is a plan view of one end of an improved welding cable constructed in accordance with the principles of the invention;

FIGURE 2 is a longitudinal sectional view substantially along the line 2—2 of FIGURE 1 looking in the direction of the arrows;

FIGURE 3 is a vertical sectional view along the line 3—3 of FIGURE 2 looking in the direction of the arrows;

FIGURE 4 is a vertical sectional view along the line 4—4 of FIGURE 2 looking in the direction of the arrows;

FIGURE 5 is an exploded view of the terminal portions of the improved welding cable;

FIGURE 6 is a vertical sectional view of the improved welding cable taken at a point away from the terminal end portions after the conductors are spirally twisted;

FIGURE 7 is a modification of the construction illustrated in FIGURE 6.

The present invention provides a cable winding wherein sandwiched layers of conductors of opposite polarity are mounted within a cable casing and are separated therein by insulators which are diametrically arranged. The layers of conductors are arranged so that cable kick will be reduced to a minimum as the welding circuit is closed in making a weld. In accordance with this aspect of the invention, two outside layers of conductors of the same polarity are sandwiched on either side of a conductor of opposite polarity which has a conducting area equal to that of the total conducting area of the outside layers of conductors.

Another aspect of the invention is mating such a conductor arrangement with terminals in a manner to provide a positive contact therebetween while maintaining passageways for cooling water from the terminals through the cable casing. Such mating is made possible by providing a plurality of sheath-like pockets on standard terminals which are arranged to receive the layers of conductors and to provide water communication between inlets in the standard terminals and passageways in the cable casing so that the heat generated in the welding operation is quickly dissipated.

Both the sandwiched conductor layer aspect of the invention and the mating aspect contribute to long cable life. By reducing kick, physical wear is substantially reduced and water-cooling prevents cable deterioration caused by excessive heat buildup.

Referring to the drawings in detail, FIGURES 1-4 show one end of a welding cable, generally designated 10, as consisting of a cable winding, generally designated 12, connected to a cable head, generally designated 14. The cable winding 12 consists of rope conductors arranged in sandwiched layers of opposite polarity generally designated 16, 18 and 20. The outside layers of rope conductors 18, 20 are of opposite polarity from the inside layer 16. Furthermore, the total conducting areas of conductors 18, 20 are equal to the conducting area of the conductor 16. It has been found that this arrangement substantially reduces the physical reaction or kick between adjacent conductors as compared to standard dual conductor cables.

The cable head 14 consists of terminals 22 and 24 separated by an insulating strip 26 of fiber, hard rubber, synthetic plastic or the like. The two terminal elements are clamped together and against the insulating strip 26 in any suitable manner as by a cap screw 27, which is insulated from the terminal 22 by an insulating bushing 29 which is threaded into a tapped opening in the terminal 22 in the manner best shown in FIGURE 2.

The cable winding 12 and the rearward portion of the cable head 14 are enclosed with a flexible resilient cable hose or casing 28 of rubber, synthetic rubber, synthetic plastic, or the like and secured in position by clamping rings, wires or bands 30 so as to prevent leakage of water. Within the casing 28, as illustrated in FIGURE 6, the rope conductor 16, 18 and 20 are separated by diametrically disposed insulating strips 32 and 34 which extend throughout the length of the casing 28 to cable head 14.

In another modification, illustrated in FIGURE 7, the rope conductors are replaced by braided conductors 33, 35 and 37. The braided conductors have the same physical relationship as their rope counterparts and are equally effective in reducing cable kick and inductance. Furthermore, the relationship of braided conductors 33, 35, 37 to the cable head 14 and cable casing 28 is the same as that of their rope conductor counterparts.

There are ordinarily two cable heads 14 to each cable 10, one on each end of the cable winding 12. These cable heads receive the novel cable winding 12 so as to provide a positive contact between a transformer and a welding gun and also to provide for cooling water passage across the cable winding 12 in the casing or hose 28.

Each of the terminals 22 and 24 of the cable head 14 has a semi-cylindrical rear portion 36 or 38 and a forward portion 40 or 42 with a flattened cutaway portion 41 or 43. The semi-cylindrical terminals 36 and 38 have flat inner surfaces 44 and 46 engaging opposite sides of the flat insulating strip 26. Transverse holes 48, 50 and 52 for a bolt (not shown) are formed in the terminal 22, the insulating strip 26 and the terminal 24, respectively.

At the rearward end of the terminals 22, 24 pockets are formed to receive the conductors 16, 18 and 20 in a manner best illustrated in FIGURE 5. These are generally flat pockets lying in planes at right angles to surfaces 44 and 46. A single sheath-like pocket 54 extends from the terminal 22 and a pair of bifurcated sheath-like pockets 56, 58, extend vertically from the terminal 24. The pockets 56, 58 extend on either side of the pocket 54 and layers of insulating material 60, 62 and 64 are provided between the vertical legs to prevent the cable from shorting out at this point. The ends of the sandwiched layers of rope conductors 16, 18 and 20 are secured in the pockets 54, 56 and 58, respectively, by a combination of heat and pressure applied on the pockets. Solder is optionally placed in the pockets 54, 56 and 58 adjacent the semi-cylindrical portions 36 and 38 of the terminals and the pocket is heated so that the solder melts and flows through the interstices between the fine hair-like wires of the cable conductors 16, 18 and 20 while pressure is exerted upon the pockets in a suitable press. This procedure has been described in the Wreford Patent 2,504,777, issued April 18, 1950, for welding cable. Since it is no part of the present invention, it need not be set out specifically herein.

Each of the flat interior surfaces 44 or 46 of each terminal element 22 or 24 is provided with a recess 66, 68 which communicates with tapped openings 70, 72 in rear portions 36, 38, respectively. The openings 70, 72 may be used to connect hose fittings for connection to a source of cooling water. Either one or both of the openings 70, 72 may be connected directly to a supply of cooling water, or one of the tapped openings 70, 72 may be plugged, as shown in FIGURE 1, by a plug 74, in which event the insulating sheet 26 is provided with a central opening aligned with the tapped openings 70, 72 through which water may flow.

The pocket portion 54 has depressions 76, 78 formed in either side thereof adjacent the rear portion 36 which communicate with the recesses 66, 68 to permit water to enter the hose casing 28. The depressions 76, 78 communicate with apertures 80, 82 formed between each of the pockets 56, 58 on the lower terminal element 24 and the pocket 54 on the top terminal element 22. These apertures communicate directly with the casing 28.

In the construction above described, leakage of water between the contacting flat surfaces 44, 46 of the terminal elements 22, 24 and the insulating sheet 26 is prevented by means of a pair of sealing strips 84 which are positioned in grooves 86 formed in the flat surfaces 44, 46 of the terminal elements 22, 24. As best shown in FIGURES 2 and 5, each flat surface 44, 46 is provided with a generally U-shaped groove 86 which, at its center portion, extends out and around the recesses 66, 68 and includes end portions 88 which lie at the edges of the flat surfaces 44, 46 of the terminal elements 22, 24 adjacent the pockets 54, 56, 58 at a region entirely within the hose or casing 28.

Positioned within each groove is a yieldable sealing strip 84 of rubber or rubber-like material which is preferably circular in cross section. As best shown in FIGURE 2, the groove 86 is generally rectangular, and the sealing strip 84 has a diameter slightly in excess of the depth of the groove so that it will be compressed between the terminal elements 22, 24 and the insulating sheet 26 upon assembly to thereby perform a sealing function. The strip extends the full length of the groove 86 including the end portions 88 and, consequently, the ends of the strip are sealed not only against the terminals 22, 24 and the flat insulating sheet 26, but also against the interior of the hose 28 at a point inwardly disposed with respect to the terminal end portion of the hose 28, which is clamped and sealed against the cylindrical outer surface 36, 38 of the terminal elements 22, 24.

As a result, the interior of the hose 28 and also the interior portion of the cable head 14, which will contain cooling water under pressure, are sealed from the exterior by a continuous seal which includes the hose 28 and the two strips of sealing material 84, thus effectively preventing leakage of cooling water.

In order to increase flexibility of the cable 10, the cable winding 12 including its conductors 16, 18 and 20 is twisted spirally as a unit at intervals of approximately nine inches for every complete turn. This twisting is done while the cable winding 12 is being assembled and prevents the flat insulating separators 32 and 34 from always being presented in the same plane. One position that the cables will assume at a point away from the cable heads 14 after twisting is illustrated in FIGURES 6 and 7. Thus, the hose 28 can be flexed easily, a flexibility being imparted by this spiral twisting which minimizes the resistance of each of the separator insulating portions 32, 34 to twisting in the direction of its own plane or its own edges.

In assembling the cable 10 of the present invention, the cable conductors 16, 18, and 20 are secured in their respective pockets 54, 56 and 58 in the terminals 22 and 24 in the manner previously described, the conductors 16, 18 and 20 are separated by the insulating layers 32 and 34 with the cable heads 14 being then twisted to impart the above described flexibility. The individual strands of the cable winding 12 are loosely packed to permit flow of cooling water between them. After this the cable hose or casing 28 is drawn over one of the cable heads 14 and over the cable winding 12 to the other cable head 14, after which it is secured into position by the clamping rings or bands 30.

The cable 10 is now ready for use when water connections (not shown) have been made to the openings 70 and 72, when the welding gun (not shown) has been secured to the forward portions 40, 42 of the terminals 22, 24 by means of a clamping bolt (not shown) inserted through the aligned bolt holes 48, 50 and 52 (FIG. 2) and when the cable head 14 at the opposite end of the cable 10 has been connected to a suitable welding transformer. The lugs projecting from the welding gun tightly engage the flattened cutaway portions 41, 43 so as to transmit with a minimum of resistance the large welding current which this cable is called upon to conduct; this, as previously stated, often being in the neighborhood of 50,000 to 60,000 amperes.

In the operation of cable 10, tthe welder carries his spot-welding gun to and from the vaious portions of his work, such as, for example, to the various portions of the body of an automobile which is under construction. The cooling water circulates freely from the recesses 66, 68 and through depressions 76, 78 and recesses 80, 82 into passageways 90, 92 and 94 formed between hose or casing 28 and the insulating strips 32 and 34. The insulating strips 32, 34 may optionally have a plurality of apertures 96 therethrough which interconnect the adjacent passageways 90, 92, 94 throughout the length of strips 32, 34. Thus, in cases where a portion of any one of the passageways becomes plugged, cooling water can bypass the plugged portion and then return to the pasageway so as to maintain water circulation over substantially all of the conductor disposed within the plugged passageway.

Since the welding current is ordinarily sixty cycle alternating current, the wire strands move towards and away from one another alternately in rapid succession, causing the cooling water to move in and out through the spaces between the strands.

Due to the fact that the total cross-sectional area of the conductors 18 and 20 (of opposite polarity from the conductor 16) is the same as the cross-sectional area of the conductor 16, the reaction between the conductors is substantially reduced. This results in a minimum amount of kick between the opposing conductors of opposite instantaneous polarity, and gives increased life to the cable, achieving the new result stated immediately after the brief description of the drawing herein and in the objects stated above. Furthermore, the novel conductor arrangement reduces inductance in the cable thereby providing a maximum power factor with lower power requirements needed to meet the welding load requirements.

It will be understood that the specific constructions of the improved water-cooled cable which are herein disclosed and described are presented for purposes of explanation and illustration and are not intended to indicate limits of the invention, the scope of which is defined by the following claims.

What is claimed is:

1. A water-cooled flexible welding cable comprising a pair of terminal elements, a first layer of conductors connected to only one of said terminal elements, second and third layers of conductors connected to only the other of said terminal elements and disposed on either side of said first layer for reducing kick and inductance within the welding cable, a flexible water-conducting hose-like casing enclosing said conductors, and means defining apertures for circulating water through said casing for cooling said layers of conductors.

2. A water-cooled flexible welding cable comprising a first layer of conductors, second and third layers of conductors disposed on either side of said first layer, said second and third layers having a conducting area substantially equal to the conducting area of said first layer of conductors for reducing kick and inductance within the welding cable, a flexible water-conducting hose-like casing enclosing said layers of conductors, terminal means connected to the ends of said layers of conductors and projecting from the ends of said casing, said terminal means comprising a pair of terminals one of which is electrically connected to only said first layer of conductors and the other of which is electrically connected to only said second and third layers of conductors, and means defining apertures through said terminal means for circulating water through said water casing for cooling said layers of conductors.

3. A water-cooled flexible welding cable comprising a first layer of conductors, second and third layers of conductors disposed on either side of said first layer, said second layer of conductors having a conducting area substantially equal to the conducting area of said third layer of conductors and the total of the conducting areas of said second and third layers of conductors being substantially equal to the conducting area of said first layer of conductors, a flexible water-conducting hose-like casing enclosing said layers of conductors, terminal means connected to the ends of said layers of conductors and projecting from the ends of said casing, said terminal means comprising a pair of terminals one of which is connected to only said first layer of conductors and the other of which is electrically connected to only said second and third layers of conductors, and means defining apertures through said terminal means for circulating water through said flexible water casing for cooling said layers of conductors.

4. A water-cooled flexible welding cable comprising sandwiched layers of conductors of opposite polarity, a flexible water-conducting hose-like generally cylindrical casing enclosing said conductors, means within said casing for electrically insulating each layer of conductors from each adjacent layer, a first terminal end portion, a sheath-like pocket on one end of said first terminal end portion and extending across the full internal diameter of said casing, a second terminal end portion, a pair of sheath-like pockets on one end of said second terminal end portion lying parallel to and on opposite sides of said sheath-like pocket on said first terminal end portion, one layer of conductors extending into said pocket on said first terminal end portion, other layers of conductors extending into the pockets on said second terminal end portion, and insulation means disposed between said pocket portions.

5. A water-cooled flexible welding cable comprising sandwiched layers of conductors of opposite polarity, a flexible water-conducting hose-like casing enclosing said conductors, means within the casing for electrically insulating each layer of conductors from each adjacent layer, a first terminal end portion having a first flat surface, a sheath-like pocket on one end of said first terminal end portion lying in a plane susbtantially perpendicular to said first flat surface, a second terminal end portion having a second flat surface, a pair of sheath-like pockets on one end of said second terminal end portion lying on opposite sides of said sheath-like pocket on said first terminal end portion and lying in planes susbtantially perpendicular to said second flat surface, one layer of conductors extending into said pocket on said first terminal end portion, other layers of conductors extending into said pockets on said second terminal end portion having a total cross-sectional area substantially equal to the cross-sectional area of the conductors received by the pocket on said first terminal end portion, and insulation means disposed between said perpendicular pocket portions and between said flat surfaces on said terminal end portions.

6. A water-cooled flexible welding cable comprising sandwiched layers of conductors of opposite polarity, a flexible water-conducting hose-like casing enclosing said conductors, means within said casing for electrically insulating each layer of conductors from each adjacent layer, a first terminal end portion having a sheath-like pocket thereon, a second terminal end portion having a pair of spaced sheath-like pockets lying an opposite sides of the sheath-like pocket on said first terminal end portion, one layer of conductors extending into said pocket on said first terminal end portion, other layers of conductors extending into said pockets on said second terminal end portion, insulation means disposed between said adjacent pockets and said terminal end portions, each of said terminal end portions having a recess therein, means communicating with said recesses for supplying cooling water thereto, sealing means in said terminal end portions for preventing leakage of water from said recesses, and said pocket on said first terminal end portion having aperture means which communicate with said recesses for conducting water from said recesses to said flexible water casing.

7. A water-cooled flexible welding cable comprising sandwiched layers of conductors of opposite polarity, a flexible water-conducting hose-like casing enclosing said conductors, means within said casing for electrically insulating each layer of conductors from each adjacent layer, a first terminal end portion having a sheath-like pocket thereon, a second terminal end portion having a pair of spaced sheath-like pockets lying on opposite sides of said sheath-like pocket on said first terminal end portion, one layer of conductors extending into said pocket on said first terminal end portion, other layers of conductors extending into said pockets on said second terminal end portion having a total cross-sectional area equal to the cross-sectional area of the conductors received by said pocket on said first terminal end portion, insulation means disposed between said adjacent pockets and said terminal end portions, said terminal end portions having recesses therein, means comunicating with said recesses for supplying cooling water thereto, sealing means in said terminal end portions for preventing leakage of water from said recesses, and said pocket portion on said first terminal end portion having means defining an aperture therethrough communicating with said flexible water casing.

8. A water-cooled flexible welding cable comprising sandwiched layers of rope conductors of opposite polarity, a flexible water-conducting hose-like casing enclosing said conductors, means within said casing for electrically insulating each layer of conductors from each adjacent layer, a first terminal end portion having a first flat surface, a sheath-like pocket on one end of said first terminal end portion lying in a plane substantially perpendicular to said first flat surface, a second terminal end portion having a second flat surface, a pair of spaced sheath-like pockets on one end of said second terminal end portion lying on opposite sides of said sheath-like pocket on said first terminal end portion and lying in planes substantially perpendicular to said second flat surface, a first layer of rope conductors extending into said pocket on said first terminal end portion, layers of rope conductors extending into said pockets on said second terminal end portion having a total cross-sectional area equal to the cross-sectional area of the rope conductors extending into the pocket portion on said first terminal end portion, insulation means disposed between said perpendicular pocket portions and between said flat surfaces on said terminal end portions, said terminal end portions each having a recess therein, means communicating with said recesses for supplying cooling water thereto, each of said terminal end portions having a groove surrounding said recesses, resilient sealing means mounted in each of said grooves extending within said flexible water casing for preventing water leakage from said recesses, and said pocket portion on said first terminal end portion having means defining an aperture therein communicating with said recesses for conducting water to said flexible water casing.

9. A water-cooled flexible welding cable comprising sandwiched layers of braided conductors of opposite polarity, a flexible water-conducting hose-like casing enclosing said braided conductors, means within said casing for electrically insulating each layer of braided conductors from each adjacent layer, a first terminal end portion having a first flat surface, a sheath-like pocket on one end of said terminal end portion lying in a plane substantially perpendicular to said first flat surface, a second terminal end portion having a second flat surface, a pair of space sheath-like pockets on one end of said second terminal portion lying on opposite sides of said sheath-lkie pocket on said first terminal end portion and lying in planes substantially perpendicular to said second flat surface, a layer of braided conductors extending into said pocket on said first terminal end portion, other layers of braided conductors extending into said pockets on said second terminal end portion having a total cross-sectional area equal to the cross-sectional area of the layer of braided conductors extending into the pocket portion on said first terminal end portion, insulation means disposed between said perpendicular pocket portions and between said flat surfaces on said terminal end portions, said terminal end portions each having a recess therein, inlet means communicating with said recesses for supplying cooling water there to, each of said terminal end portions having a groove surrounding said recesses, resilient sealing means mounted in said groove extending within said flexible water casing for preventing water leakage from said recesses, and said pocket portion on said first terminal end portion having means defining an aperture therein communicating with said recesses for conducting water to said flexible water casing.

References Cited in the file of this patent
UNITED STATES PATENTS

| | | |
|---|---|---|
| 2,702,311 | Botterill et al. | Feb. 15, 1955 |
| 2,931,850 | Wreford | Apr. 5, 1960 |